United States Patent
Godridge et al.

(10) Patent No.: US 11,223,308 B2
(45) Date of Patent: Jan. 11, 2022

(54) METHOD OF CONTROLLING A MULTI-CHANNEL MULTI-PHASE ELECTRICAL MACHINE

(71) Applicant: Siemens Gamesa Renewable Energy A/S, Brande (DK)

(72) Inventors: Paul Godridge, Cheadle (GB); Yashan Hu, Changsha (CN); Arwyn Thomas, Cheshire (GB); Zhan-Yuan Wu, Sheffield (GB)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 16/961,745

(22) PCT Filed: Jan. 11, 2019

(86) PCT No.: PCT/EP2019/050656
§ 371 (c)(1),
(2) Date: Jul. 13, 2020

(87) PCT Pub. No.: WO2019/141600
PCT Pub. Date: Jul. 25, 2019

(65) Prior Publication Data
US 2021/0067074 A1    Mar. 4, 2021

(30) Foreign Application Priority Data

Jan. 18, 2018 (EP) ..................................... 18152303

(51) Int. Cl.
*H02P 23/00*    (2016.01)
*H02P 25/00*    (2006.01)
(Continued)

(52) U.S. Cl.
CPC ................ *H02P 21/05* (2013.01); *F03D 7/00* (2013.01); *F03D 9/25* (2016.05); *H02P 21/22* (2016.02); *H02P 2101/15* (2015.01)

(58) Field of Classification Search
CPC . H02P 21/05; H02P 21/22; F03D 9/25; F02D 7/00
(Continued)

(56) References Cited

U.S. PATENT DOCUMENTS 9,571,017 B2 * 2/2017 Hirotani .................. H02P 25/22
11,038,453 B2 * 6/2021 Taniguchi ............... H02P 21/22
2017/0338756 A1 11/2017 Jung

FOREIGN PATENT DOCUMENTS

EP    2043255 A2    4/2009
EP    3223422 A1    9/2017
(Continued)

OTHER PUBLICATIONS

International Search Report and Written Opinion dated May 7, 2019 for PCT/EP2019/050656.

*Primary Examiner* — Erick D Glass
(74) *Attorney, Agent, or Firm* — Schmeiser, Olsen & Watts, LLP

(57) ABSTRACT

Provided is a method of controlling a multi-channel multi-phase electrical machine including a plurality of channels each with a set of phase windings connected to a converter, which method includes the steps of operating the converters to electrically phase-shift the channels; computing harmonic injection currents for a dominant harmonic on the basis of electrical quantities in a rotating reference frame; determining harmonic voltage references for the dominant harmonic on the basis of the harmonic injection currents; and regulating the AC output voltages of the channels according to the fundamental voltage references and the harmonic voltage references. Also provided is a control arrangement of a
(Continued)

multi-channel multi-phase electrical machine; a wind turbine; and a computer program product.

14 Claims, 9 Drawing Sheets

(51) Int. Cl.
  *H02P 27/00*    (2006.01)
  *H02P 21/05*    (2006.01)
  *H02P 21/22*    (2016.01)
  *F03D 9/25*     (2016.01)
  *F03D 7/00*     (2006.01)
  *H02P 101/15*    (2016.01)

(58) Field of Classification Search
  USPC ........................................................ 318/807
  See application file for complete search history.

(56)      References Cited

FOREIGN PATENT DOCUMENTS

EP     3264593 A1   1/2018
EP     3649731 A1   5/2020

* cited by examiner

METHOD OF CONTROLLING A MULTI-CHANNEL MULTI-PHASE ELECTRICAL MACHINE

CROSS-REFERENCE TO RELATED APPLICATIONS

This application claims priority to PCT Application No. PCT/EP2019/050656, having a filing date of Jan. 11, 2019, which is based on EP Application No. 18152303.6, having a filing date of Jan. 18, 2018, the entire contents both of which are hereby incorporated by reference.

FIELD OF TECHNOLOGY

The following describes a method of controlling a multi-channel multi-phase electrical machine; a control arrangement of a multi-channel multi-phase electrical machine; and a wind turbine comprising a multi-channel multi-phase generator.

BACKGROUND

A multi-phase electrical machine such as a generator or motor seldom operates ideally, and there is generally some degree of ripple in one or more of output variables. For example, a multiphase generator may exhibit torque ripple as well as ripples on its output voltage and output power. The magnetic flux distribution in the airgap is determined to a large extent by the generator design. Harmonics in the magnetic flux result in ripple in the electromagnetic torque, machine electrical power and terminal voltages, i.e. the three-phase voltages of each channel of the electrical machine.

The different kinds of ripple are problematic for various reasons. Torque ripple causes vibration of the electrical machine, and must be reduced in order to avoid material fatigue. The vibrations caused by torque ripple result in acoustic noise. Particularly in the case of wind turbines, measures must be taken to reduce torque ripple in order to comply with acoustic regulations, which are often very strict. Various control methods that are known from the conventional art, for example as described in EP3223422A1 and EP2043255A2, are limited to reducing acoustic noise arising from torque ripple.

Voltage ripple results primarily from harmonics in the machine EMF and the phase currents. In the presence of voltage ripple, the voltage usage for control of such an electrical machine may have to be reduced when fed from a voltage source converter. This is because, for a typical three-phase voltage source converter, the DC link voltage places a limit on the maximum value of the terminal voltage. This effectively defines a saturation level for the modulation depth. However, a high modulation depth is necessary to operate such a machine efficiently. Generally, to allow for current control dynamics, a margin is reserved between design value and maximum value. If there is ripple on the control voltage, the level of the average voltage must be lowered to remain below the saturation level. This amounts to a lowering of the modulation depth. In the conventional art, this problem has been addressed by applying a technique of harmonic current injection to reduce torque ripple. This known approach of harmonic current injection is normally done by current injection in the q-axis. It is also possible to minimize voltage ripple and torque ripple by harmonic current injection in the d-axis.

However, ripple in the machine electrical power (or simply "power ripple") is not reduced by harmonic current injection in the d and q axes, and may even be increased instead. Power ripple will be passed on to the DC link and will generate heat in the capacitors of the DC link, thereby shortening their useful lifetime. The capacitors require cooling, which is difficult to achieve and which adds to the overall cost. A DC link may also comprise batteries, and any power ripple will also generate heat in the batteries, reducing their useful lifetime.

Power ripple should also be prevented from passing to the grid, since harmonics may violate grid regulations and may cause control instability in the grid converter. This is particularly relevant for large generators such as wind turbines that generate power in the megawatt range, since power ripple may reach an amplitude of 100 kW.

SUMMARY

An aspect relates to an improved way of controlling an electrical machine to reduce ripple while overcoming the problems outlined above.

The inventive method is provided for controlling a multi-channel multi-phase electrical machine comprising a plurality of channels each with a set of phase windings connected to a converter. It will be assumed in the following that the electrical machine is designed to electromagnetically phase-shift the channels. According to embodiments of the invention, the method comprises the steps of operating the converters to electrically phase-shift the channels accordingly and then, for each channel, computing harmonic injection currents for a specific harmonic on the basis of electrical quantities in a rotating reference frame. The injection currents may also be referred to as injection current references or injection current demands in the following. The injection currents are computed on the basis of a target ripple value for the dominant harmonic, which target ripple value comprises a target power ripple component and a target voltage ripple component. Harmonic voltage references (or "harmonic voltage demands") for a specific harmonic are then calculated on the basis of the harmonic injection currents, and the AC output voltages of the channel are subsequently calculated on the basis of the harmonic voltage references and fundamental voltage references.

To simplify control of a multi-channel multi-phase machine, it is usual to perform a suitable transformation so that an AC variable which alters its value as a function of the rotating magnetic field can be treated as if it were a DC variable. This greatly simplifies calculations. For example, as will be known to the skilled person, a dq0 transformation or Park transformation can be performed on the AC voltage and current values to obtain voltage and current vectors in a rotating dq0 reference frame (also referred to as a dq reference frame). In the context of embodiments of the invention, the term "injection current" is to be understood as a current vector comprising a d-axis component and a q-axis component in the rotating reference frame.

In the context of embodiments of the invention, the specific harmonic is the dominant harmonic. The dominant harmonic is a certain multiple of the machine electrical frequency and depends on the number of phases in a channel. For example, in a three-phase electrical machine, the dominant harmonic is at six times the electrical frequency, i.e. the sixth harmonic appears in the frequency spectrum at six times the fundamental frequency or machine frequency $f_0$. This harmonic may be simply referred to as the "6f harmonic". Embodiments of the invention is based on the insight that, in a multi-channel multi-phase machine with an electromagnetic phase-shift between the channels, torque ripple at the dominant harmonic can be cancelled out. Although embodiments of the invention can be used for essentially any multi-channel multi-phase electrical machine, for the sake of simplicity it will be assumed in the following that the electrical machine has two channels, each with three phases, and that there is a 30° phase-shift between the two channels. An electrical machine with two three-phase channels is generally referred to as a dual three-phase machine. In a dual three-phase machine with a 30° phase-shift between the two channels, torque ripple at the 6f harmonic is cancelled out.

An advantage of the control method according to embodiments of the invention is that additional freedom of control arises from the effective elimination of the 6f torque ripple by phase-shifting the two channels. Because the 6f torque ripple is already taken care of, the electrical machine can better tolerate the presence of 6f harmonics in the phase currents. In other words, it is not necessary to design the machine to prevent development of 6f flux linkages that are represented in the rotating reference frame. Instead, it is possible to apply a relatively straightforward control method to eliminate or at least very significantly reduce the 6f voltage ripple as well as the 6f power ripple.

When the inventive control method is used by an electrical machine such as a wind turbine generator, reducing the 6f power ripple to a favorably low level or even eliminating it entirely results in a higher bandwidth for the DC link control. Increasing the DC link bandwidth significantly improves power flow between generator and grid. A further advantage of reducing or eliminating the 6f power ripple is that the size of the DC link capacitors may be reduced, and smaller capacitors are less costly, so that the overall cost of a wind turbine can be reduced.

According to embodiments of the invention, the control arrangement of a multi-channel multi-phase electrical machine comprises a voltage reference generator realized to generate fundamental voltage references for the machine frequency; a harmonic voltage reference generator (realized to generate harmonic voltage references for a selected dominant harmonic of the machine frequency; and an output voltage controller realized to control a machine output voltage on the basis of the fundamental voltage demands and the harmonic voltage demands.

The inventive control arrangement can advantageously be implemented in any controller of an already existing multi-channel multi-phase electrical machine, for example a dual three-phase electrical machine with a 30° electromagnetic phase shift between channels, so that the performance of an already existing machine can be improved.

In the context of embodiments of the invention, it may be assumed that the converters are controlled by pulse-width modulation (PWM), and that the fundamental voltage references and the harmonic voltage references are input to a PWM controller that determines the generator output voltage. The voltage reference generator may also be referred to as the fundamental controller since it generates voltage references for the machine frequency or fundamental frequency.

According to embodiments of the invention, the wind turbine comprises a multi-channel multi-phase generator, preferably a dual three-phase generator, and a controller that implements an embodiment of the inventive control arrangement. An advantage of the inventive wind turbine is that the dynamic in power flow between the generator and the grid can be improved (compared to a wind turbine that does not implement the inventive control method), since the reduced 6f power ripple results in a higher bandwidth for DC link control. Furthermore, the inventive wind turbine can be constructed at a lower cost, since the DC link capacitors can be smaller that a comparable wind turbine that does not implement the inventive control method.

According to embodiments of the invention, the computer program product (non-transitory computer readable storage medium having instructions, which when executed by a processor, perform actions) comprises a computer program that is directly loadable into a memory of a controller of a multi-channel multi-phase electrical machine and which comprises program elements for computing harmonic voltage references for use in the inventive control method when the computer program is executed by the controller of the multi-channel multi-phase electrical machine.

The units or modules of the computer program product can be completely or partially realized as software modules running on a processor of the controller.

Particularly advantageous embodiments and features of the invention are given by the dependent claims, as revealed in the following description. Features of different claim categories may be combined as appropriate to give further embodiments not described herein.

As indicated above, the inventive method may be applied to any multi-channel multi-phase machine, for example a quad (four channel) three-phase machine with 15° phase-shift between the channels. However, for the sake of clarity, and without restricting embodiments of the invention in any way, it may be assumed that the electrical machine is a dual three-phase wind turbine generator. Again, without restricting embodiments of the invention in any way, it may be assumed that the generator is realized as a fractional slot concentrated windings generator.

In the inventive control method, for each channel, the harmonic injection currents are preferably computed using a model that relates generator electrical values to generator speed. An advantage of this approach is that the generator electrical values and generator speed are quantities that can be measured with relative ease, and a wind turbine controller will generally already comprise some means of measuring these quantities.

According to embodiments of the invention, the injection currents are computed for each channel on the basis of a target ripple value or target ripple reference for the dominant harmonic. For example, a target ripple value may comprise a target power reference and a target voltage reference. Alternatively, the target ripple value may be in the form of a vector, with a target power ripple component and a target voltage ripple component. For example, the target ripple vector can comprise the sine and cosine terms of power ripple and voltage ripple.

According to embodiments of the invention, the harmonic voltage reference generator comprises computation modules realized to compute a generator power value and a generator voltage value on the basis of electrical quantities in the rotating reference frame; an injection current computation module realized to compute injection current references ("injection current demands") for the dominant harmonic on the basis of the generator power value and a generator voltage value; and a harmonic current controller realized to compute the harmonic voltage references from the harmonic injection current references to obtain the final control voltages for PWM operation.

The harmonic voltage reference generator of the inventive control arrangement comprises a harmonic current controller that outputs the harmonic voltage reference components, i.e. the d-axis component and the q-axis component of the harmonic voltage reference vector. The harmonic voltage reference components are then passed to the PWM controller, which adds them to the fundamental voltage reference components to determine the generator output voltage for that channel, as explained above. The generator output voltage or terminal voltage of each channel will have favorably low or negligible voltage ripple.

There are various possible ways of computing the 6f injection current references when carrying out the inventive method. In a first approach, the harmonic injection currents are computed using a feedforward control method. In this approach, the injection current computation module is realized to compute the 6f current references working backwards from a desired or target ripple that was specified for the machine output voltage and power. A machine model is used to approximate the relationship between torque ripple, voltage ripple and power ripple.

In a second approach, the harmonic injection currents are computed using a decoupled feedback control method implementing a harmonic power regulator and a harmonic voltage regulator. In this approach, the injection current computation module comprises a 6f power regulator and a 6f voltage regulator. The 6f power regulator receives a 6f generator power value and a 6f power ripple reference, and computes a d-axis injection current value as well as a q-axis injection current value. The 6f voltage regulator receives a 6f generator voltage value and a 6f voltage ripple reference, and computes a q-axis injection current value as well as a d-axis injection current value. The d-axis components are summed, the q-axis components are summed, and the resulting d-axis and q-axis injection current values are passed on to the harmonic current controller.

In a third approach, the harmonic injection currents are computed using a multivariable feedback control method. In this approach, the injection current computation module implements a multivariable regulator that is realized to optimize a specific term, formed from the normalized voltage ripple and power ripple. As the objective is to minimize this single term, the technique of regulation used in the above feedback control can be applied, and the required $I_{d6*}$ and $I_{q6*}$ values can be generated and fed to harmonic current controllers to obtain the voltage demands.

BRIEF DESCRIPTION

Some of the embodiments will be described in detail, with reference to the following figures, wherein like designations denote like members, wherein.

DETAILED DESCRIPTION

Figure 1:
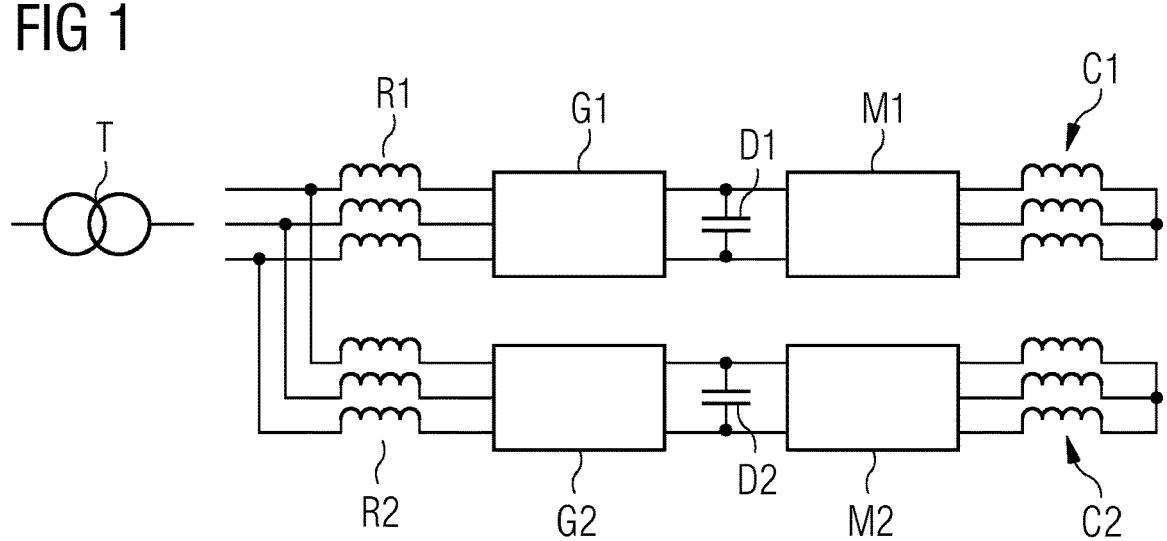
FIG. 1 shows a simplified electrical diagram of a dual three-phase electrical machine.

FIG. 1 shows a simplified electrical diagram of a dual three-phase electrical generator. The two channels C1, C2 of the generator are indicated on the right. The terminal voltages of each channel C1, C2 are controlled by a machine-side converter M1, M2. A DC link capacitor D1, D2 is arranged in the DC link between a machine-side converter M1, M2 and a grid-side converter G1, G2. The grid-side converters G1, G2 are connected to a transformer T via line reactors R1, R2.

Figure 2:
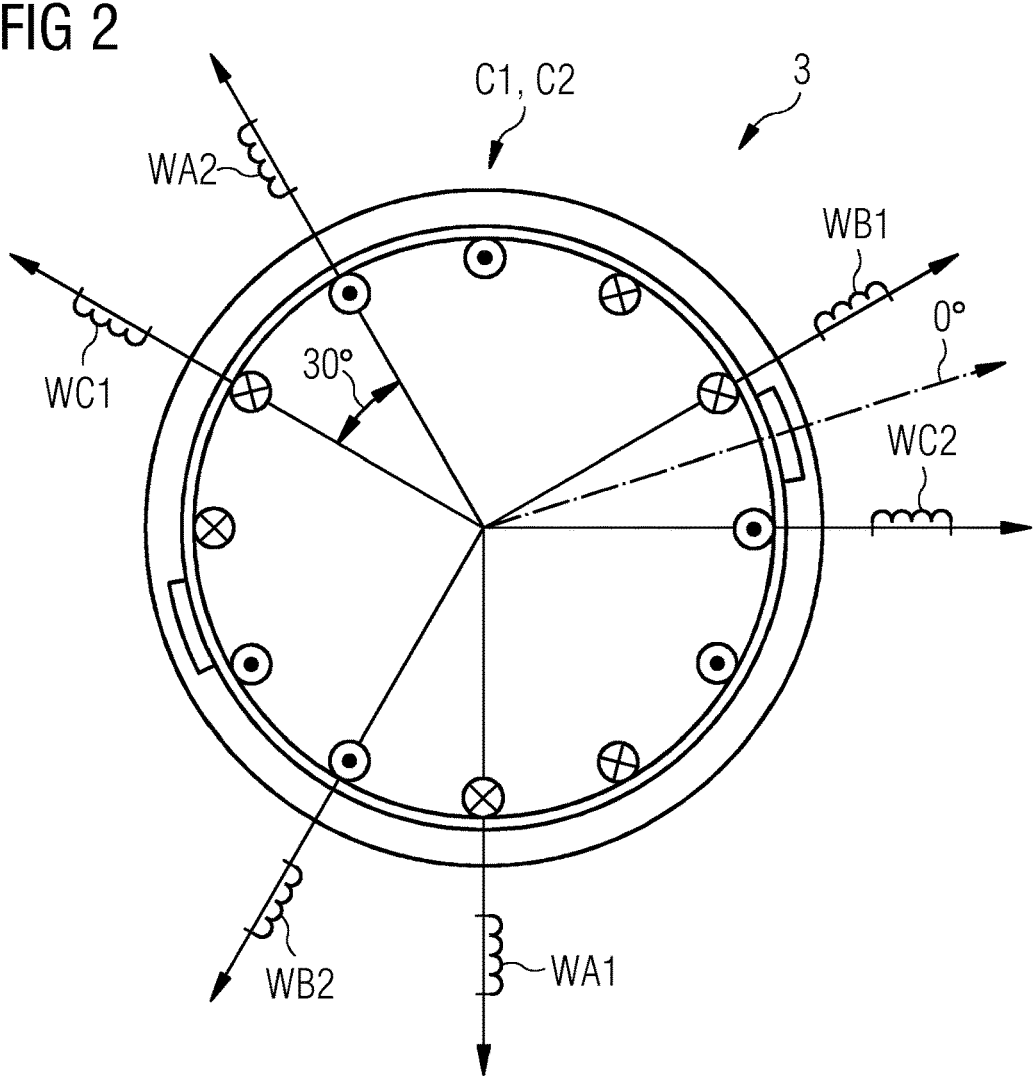
FIG. 2 illustrates an electromagnetic phase-shift between windings of the first channel and windings of the second channel of the electrical machine of FIG. 1.

FIG. 2 illustrates a 30° phase shift between the first channel and the second channel of FIG. 1, by overlaying phasor diagrams of the channel currents on a simplified representation of the stator. The first channel C1 is represented by three windings WA1, WB1, WC1 and the second channel C2 is represented by three windings WA2, WB2, WC2. Here, the windings are connected in a star configuration (a delta configuration is equally possible). The 30° phase shift between the first channel C1 and the second channel C2 has been shown to have various advantages, one of which is that 6f torque ripple is effectively cancelled out.

Figure 3:
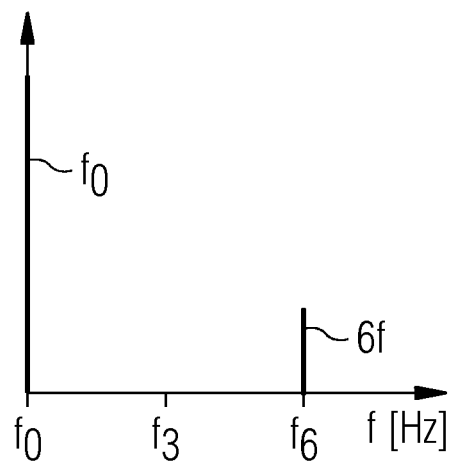
FIG. 3 shows an exemplary frequency spectrum of a dual three-phase electrical machine.

FIG. 3 shows an exemplary frequency spectrum of a dual three-phase electrical machine controlled using a conventional control approach. The diagram indicates the fundamental $f_0$ (at the machine electrical frequency) and a number of harmonics. In a dual three-phase electrical machine, the sixth harmonic 6f (at six times the machine electrical frequency) is the largest (dominant) and therefore also the most problematic harmonic. The amplitude of a harmonic in the frequency spectrum (relative to the amplitude of the fundamental $f_0$) corresponds to the amplitude of the ripple component that is overlaid on the output voltage or output power.

Figure 4:
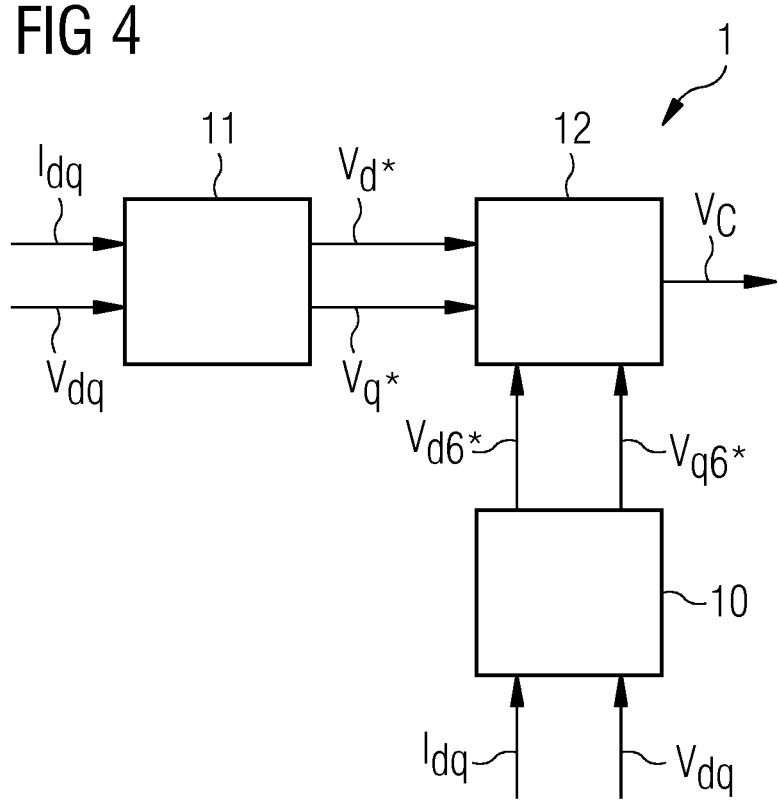
FIG. 4 shows a simplified block diagram of the inventive control arrangement.

FIG. 4 shows a simplified block diagram of the inventive control arrangement 1. A transformation has been performed on the measured current to obtain vector $I_{dq}$ in the rotating dq0 reference frame, whilst $V_{dq}$ is the voltage vector derived from an $I_{dq}$ current controller (not shown), as will be known to the skilled person. The vectors $I_{dq}$, $V_{dq}$ are passed to a fundamental controller 11 that generates voltage references $V_{d*}$, $V_{q*}$ for a PWM control unit 12 that determines or regulates the output voltages $V_C$ or terminal voltages $V_C$ of that channel. The current vector $I_{dq}$ shall be understood to comprise a d-axis component $I_d$ and a q-axis component $I_q$ in the rotating reference frame. The same applies for the voltage vector $V_{dq}$, which shall be understood to also comprise a d-axis component $V_d$ and a q-axis component $V_q$ in the rotating reference frame. A conventional control arrangement generally only comprises a fundamental controller and a PWM control unit that determines or regulates the terminal voltages $V_C$ using only the fundamental voltage references $V_{d*}$, $V_{q*}$.

In the inventive control arrangement, the vectors $I_{dq}$, $V_{dq}$ are also passed to a harmonic voltage reference computation module 10 that can be realized in one of several ways as will be explained below, and which comprises a 6f reference computation module that provides harmonic voltage references $V_{d6*}$, $V_{q6*}$ to be added by the PWM control unit to the fundamental voltage references $V_{d*}$, $V_{q*}$. The harmonic voltage reference computation module 10 is realized to provide 6f voltage references $V_{d6*}$, $V_{q6*}$, i.e. voltage references that will result in a minimization of the 6f ripple on the machine output voltage and output power. In the inventive control arrangement 1, the PWM control unit 12 for that channel determines the generator output voltage V not only on the basis of the fundamental voltage references $V_{d*}$, $V_{q*}$, but also by taking into consideration the harmonic voltage references $V_{d6*}$, $V_{q6*}$, so that the dominant harmonic ripple on the output power and voltage of that channel can be minimized or even eliminated.

Figure 5:
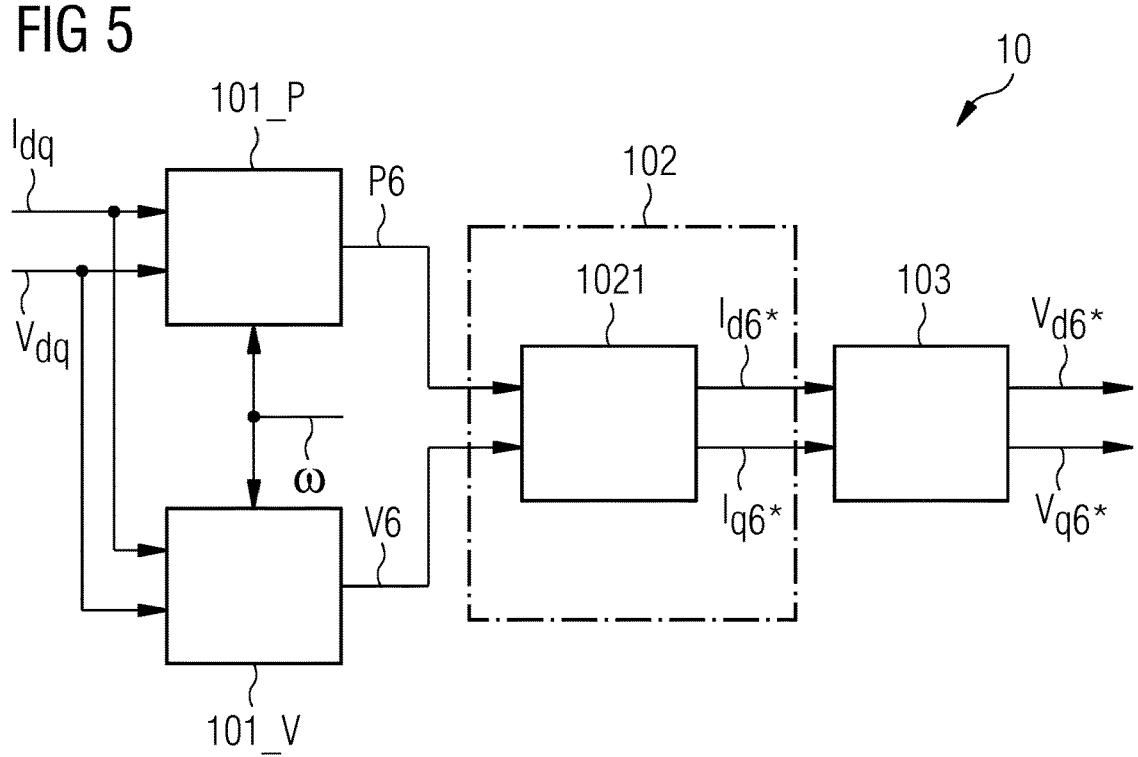
FIG. 5 shows a block diagram of a first embodiment of an injection current computation module for the control arrangement of FIG. 4.
Figure 6:
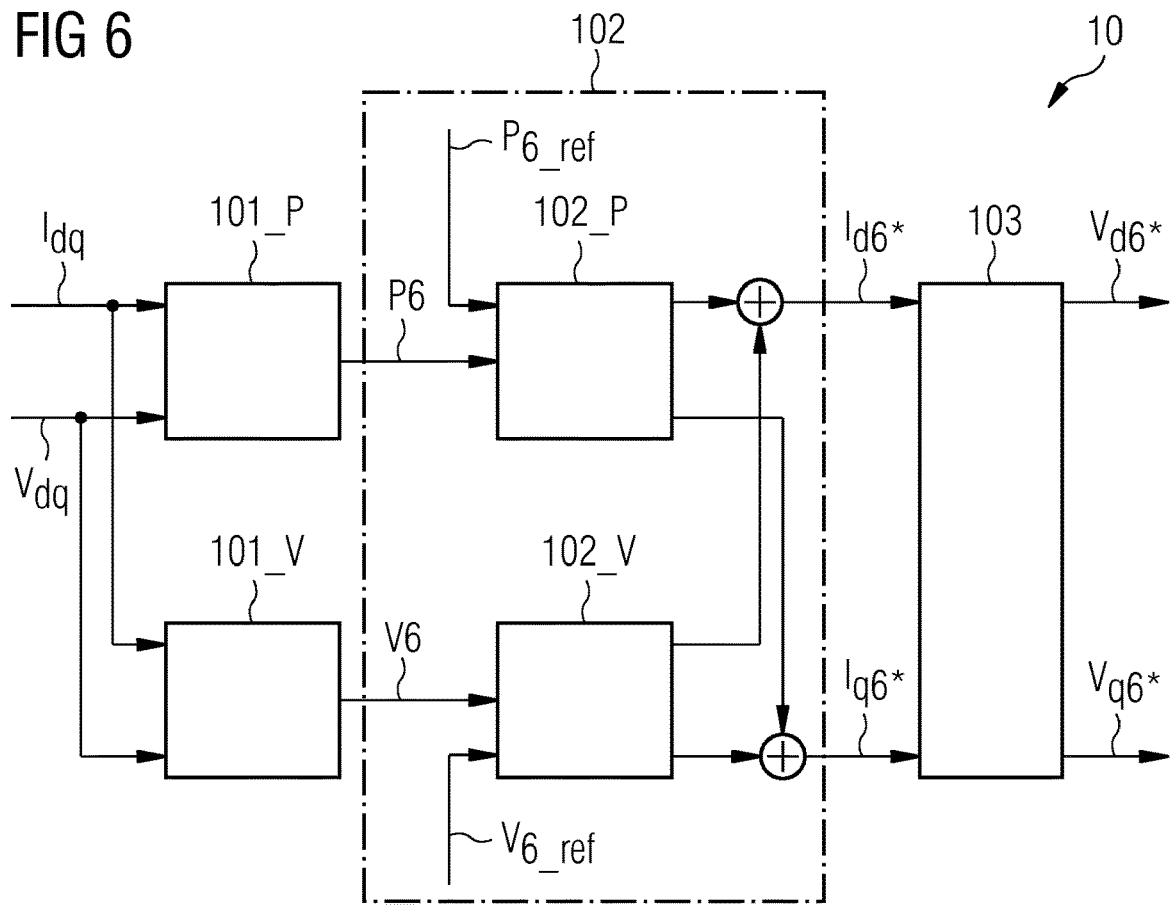
FIG. 6 shows a block diagram of a second embodiment of an injection current computation module for the control arrangement of FIG. 4.
Figure 7:
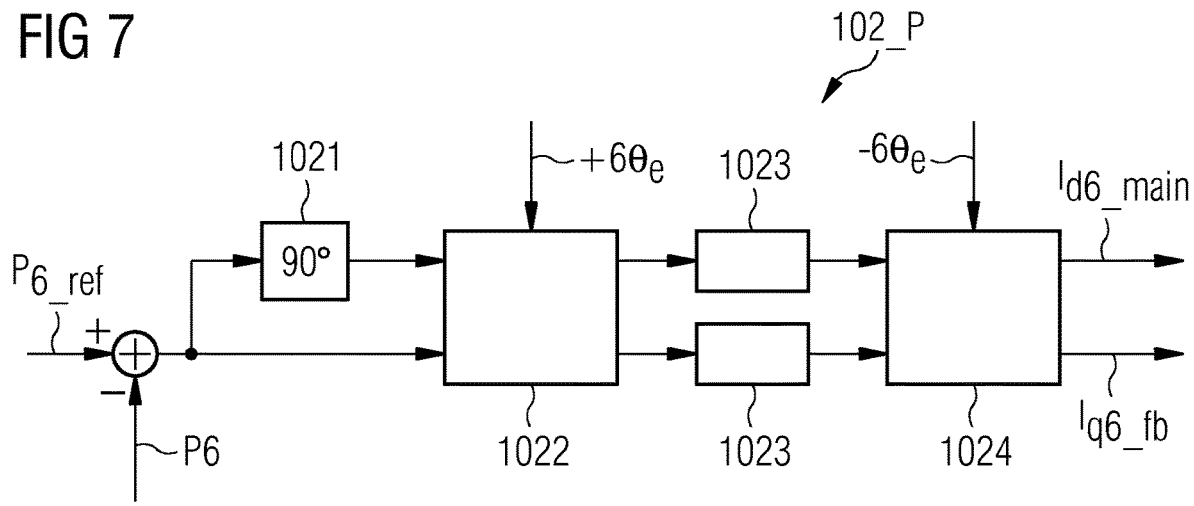
FIG. 7 shows a block diagram of a harmonic regulator implemented in the control arrangement of FIG. 6.

FIGS. 5, 6 and 7 show various possible embodiments of the 6f reference computation module 102 of the harmonic voltage reference computation module 10. In each case, a generator power computation module 101_P computes a value of the generator power sixth harmonic P6 on the basis of the vectors $I_{dq}$, $V_{dq}$, and a generator voltage computation module 101_V computes a value of the generator voltage sixth harmonic V6 on the basis of the vectors $I_{dq}$, $V_{dq}$. Each computation module 101_P, 101_V includes a speed-dependent band-pass filter to only pass the sixth harmonic frequency. Injection references $I_{d6*}$, $I_{q6*}$ are computed in an injection current computation module 102 and passed to a harmonic current controller 103 which in turn generates the 6f voltage references $V_{d6*}$, $V_{q6*}$.

In FIG. 5, the injection current computation module 102 implements as a ripple control module 1021 (or "ripple minimization module") using a feedforward approach. At a given operating point with a certain speed and a certain load, the 6f power ripple $P_6$ can be expressed as $$P_6 = 3/2\omega[I_q\psi_{pm6a}\cos(6\theta) + I_{q6}\psi_{pm0}\cos(6\theta+\delta_{q6}) - I_d\psi_{pm6b}\sin(6\theta) - 6L_dI_dI_{q6}\sin(6\theta+\delta_{q6}) - 6L_dI_dI_{d6}\sin(6\theta+\delta_{d6})] \quad (1)$$

where $\omega$ is the speed or electrical angular frequency of the machine; $I_d$, $I_q$, $V_d$ and $V_q$ are the d-axis and q-axis components of the vectors $I_{dq}$, $V_{dq}$; and $I_{d6}$ and $I_{q6}$ are the harmonic current vectors that will be injected at the respective phase angles of $\delta_{d6}$ and $\delta_{q6}$ for the injection currents. $\psi_{pm0}$ is the DC value of flux linkage from the permanent magnets, and $\psi_{pm6a}$ and $\psi_{pm6b}$ are derived from the 6f harmonic values in the d and q-axis permanent magnet flux linkage according to $$\psi_{pm6a} = 6\psi_{pm6q} + \psi_{pm6d} \quad (1.1)$$

$$\psi_{pm6b} = 6\psi_{pm6d} + \psi_{pm6q} \quad (1.2)$$

At that operating point, the 6f voltage ripples $v_{d6}$, $v_{q6}$ can be expressed as $$v_{d6} = -\psi\psi_{pm6b}\sin(6\theta) - \omega L_qI_{q6}\cos(6\theta+\delta_{q6}) - 6\omega L_dI_{d6}\sin(6\theta+\delta_{d6}) \quad (2)$$

$$v_{q6} = \omega\psi_{pm6a}\cos(6\theta) - 6\omega L_gI_{q6}\sin(6\theta+\delta_{q6}) + \omega L_dI_{d6}\cos(6\theta+\delta_{d6}) \quad (3)$$

and the rms voltage 6f ripple $v_{rms6}$ can be expressed as $$v_{rms6} = \frac{1}{v_{rms0}}(V_dv_{d6} + V_qv_{q6}) \quad (4)$$

where $v_{rms0}$ is the fundamental rms (root mean square) voltage. A current injection vector $I_{inj}$ can then be defined as:

$$I_{inj} = \begin{bmatrix} I_{d6}\cos(\delta_{d6}) \\ I_{d6}\sin(\delta_{d6}) \\ I_{q6}\cos(\delta_{q6}) \\ I_{q6}\sin(\delta_{q6}) \end{bmatrix} \quad (5)$$

The 6f power ripple $P_6$ and 6f rms voltage ripple $v_{rms6}$ can also be expressed as $$v_{rms6} = V_{6\_cos}\cos(6\theta) + V_{6\_sin}\sin(6\theta) \quad (6)$$

$$p_6 = P_{6\_cos}\cos(6\theta) + P_{6\_sin}\sin(6\theta) \quad (7)$$

in which the relationship between the current injection vector and the output ripple vector is expressed as:

$$R_6 = A \cdot I_{inj} + B \quad (8)$$

where the matrices A and B are related to the machine parameters and the fundamental electrical quantities only, and can be derived by using the equations presented above. For example, $$A = \begin{bmatrix} 0 & -6L_dI_q & \psi_{pm0} & -6L_qI_q \\ -6L_dI_d & 0 & -6L_qI_q & -\psi_{pm0} \\ L_dV_q & -6L_dV_d & -L_qV_d & -6L_qV_q \\ -6L_qV_q & -L_dV_q & -6L_qV_q & L_qV_d \end{bmatrix}$$

$$B = \begin{bmatrix} I_q\psi_{pm6a} \\ -I_d\psi_{pm6b} \\ V_q\psi_{pm6a} \\ -V_d\psi_{pm6b} \end{bmatrix}$$

An output ripple vector $R_6$ can be put together from the sine and cosine terms of the 6f power ripple $P_6$ and 6f voltage ripple $V_6$:

$$R_6 = \begin{bmatrix} P_{6\_cos} \\ P_{6\_sin} \\ V_{6\_cos} \\ V_{6\_sin} \end{bmatrix} \quad (9)$$

allowing the terms $P_{6\_cos}$, $P_{6\_sin}$, $V_{6\_cos}$, $V_{6\_sin}$ to be established for equation (6) and equation (7). For example, if the target 6f power ripple and target 6f voltage ripple are each zero, the ripple vector is a 4×1 vector of null entries. With the ripple vector set up, and the closed form of matrices A and B derived from the machine parameters and the fundamental electrical quantities, values for the 6f power ripple $P_6$ and the 6f rms voltage ripple $V_{rms6}$ can be calculated.

Subsequently, using equation (1), the required harmonic currents $I_{d6}$, $I_{q6}$ can be calculated from the target power ripple and target rms voltage ripple. Because power ripple can also be expressed in terms of voltage or current ripple, this machine parameter dependency may be removed. FIG. 6 shows a block diagram of a second embodiment of the injection current computation module 102 for the control arrangement of FIG. 4. Here, the harmonic currents $I_{d6}$, $I_{q6}$ are calculated using a pair of harmonic power and voltage regulators 102_P, 102_V connected in a feedforward arrangement. A harmonic power regulator 102_P receives the 6f power ripple $P_6$ from the generator power computation module 101_P, and a power reference P6_ref (e.g. zero), and computes a d-axis current reference component $I_{d6*}$ and a q-axis current reference component $I_{q6}*$. Since dominant harmonic power ripple is to be minimized, the value of the power reference P6_ref may be zero.

A harmonic voltage regulator 102_V receives the 6f voltage ripple $V_6$ from the generator voltage computation module 101_V, and a voltage reference V6_ref (e.g. zero), and computes a d-axis current reference component $I_{d6*}$ and a q-axis current reference component $I_{q6}*$. In this case also, since dominant harmonic voltage ripple is to be minimized, the value of the voltage reference V6_ref may be zero.

The d-axis components are summed to obtain the d-axis current reference $I_{d6*}$. The q-axis components are summed to obtain the q-axis current reference $I_{q6*}$. The current references $I_{d6*}$, $I_{q6*}$ are then passed to the harmonic current controller 103 which generates the 6f voltage references $V_{d6*}$, $V_{q6*}$.

FIG. 7 shows an exemplary block diagram of the harmonic power regulator 102_P of FIG. 5 (the harmonic voltage regulator 102_V is constructed identically, and only the relevant signals must be substituted). A feedback signal P6 is subtracted from the reference signal P6_ref. The result is passed to a 90° phase-shifter 1021 and also to a frame transformation module 1022, which performs a transformation of the non-phase-shifted with the phase-shifted signals from a dq rotating reference frame to a frame rotating at the 6f frequency. The outputs of the frame transformation module 1022 are passed to two proportional-integral controllers 1023, whose outputs are in turn passed to a second phase transformation module 1024 that generates the d-axis current reference component $I_{d6*}$ and the q-axis current reference component $I_{q6}*$.

Figure 8:
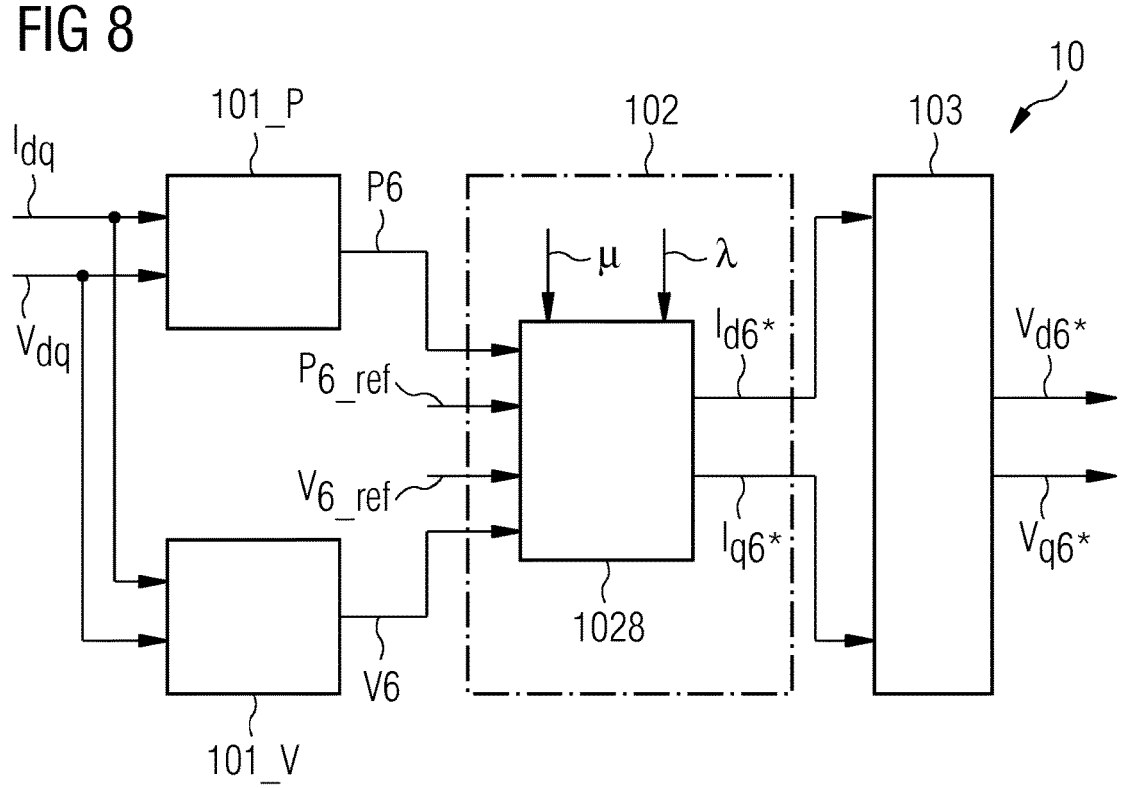
FIG. 8 shows a block diagram of a third embodiment of an injection current computation module for the control arrangement of FIG. 4.

FIG. 8 shows a block diagram of a third embodiment of the injection current computation module 102 for the control arrangement of FIG. 4. Here, a multivariable regulator 1028 receives the 6f power ripple $P_6$ from the generator power computation module 101_P and the 6f voltage ripple $V_6$ from the generator voltage computation module 101_V. The multivariable regulator 1028 is also given weighting factors λ, μ. The multivariable regulator 1028 is realized to optimize the following equation:

$$y = \sqrt{\lambda\left(\frac{P_6}{P_0}\right)^2 + \mu\left(\frac{V_6}{V_0}\right)^2} \qquad (10)$$

where y is the objective signal that is derived from the feedback of power ripple and voltage ripple ($P_6$, $V_6$) and from the DC values in the power and voltage ($P_0$, $V_0$). Since the objective is to minimize y, the technique of regulation shown in FIG. 6 can be applied, and the required values of $I_{d6*}$ and $I_{q6*}$ can be generated and then passed to the HCC controllers to compute the voltage demands.

Figure 9:
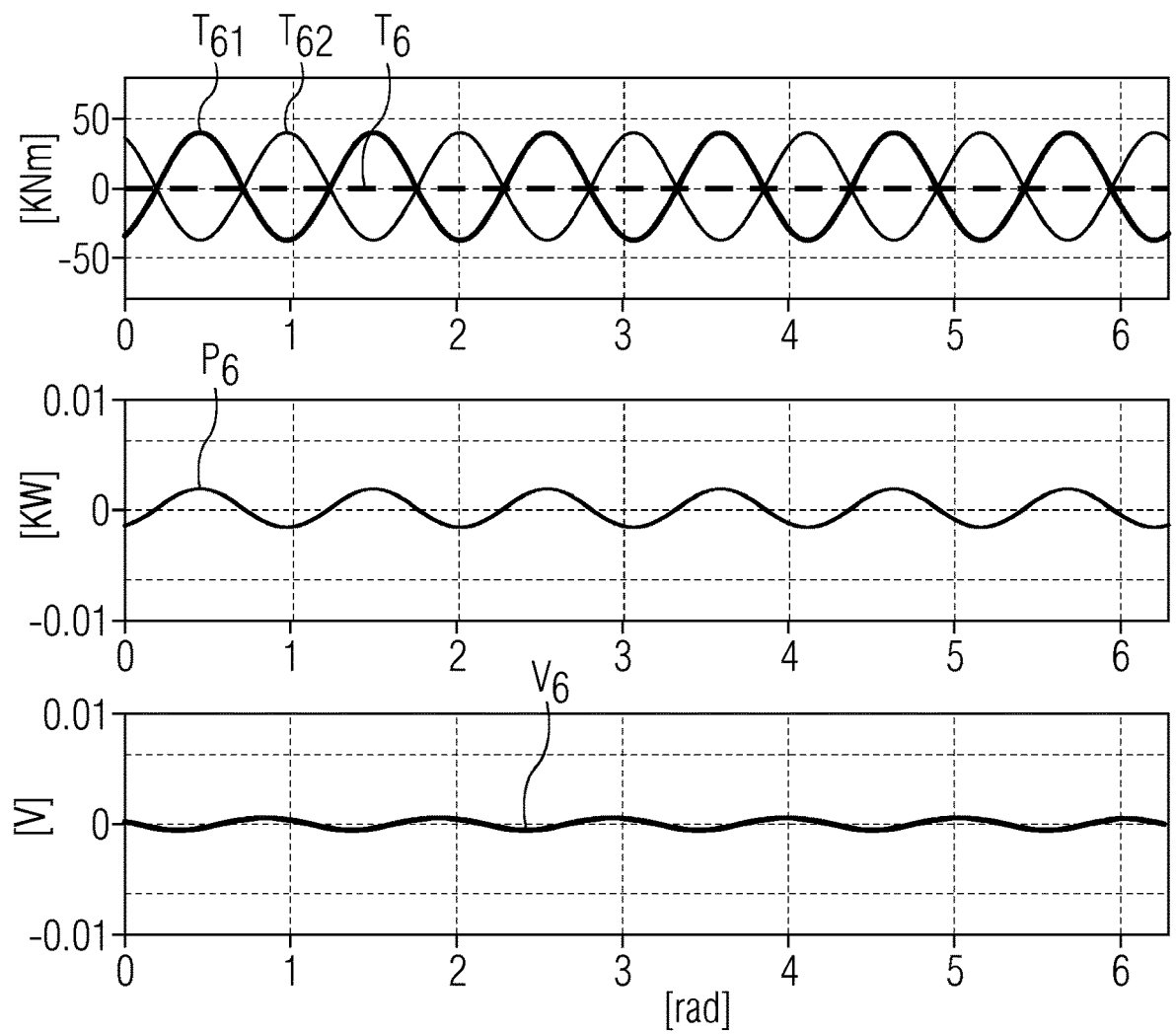
FIG. 9 shows 6f ripple waveforms resulting from the inventive control method.

FIG. 9 illustrates the simultaneous minimization of all three 6f ripples when the inventive method is applied in the control of a dual three-phase machine in which the two channels C1, C2 are electromagnetically phase shifted by 30°. The upper part of the diagram shows the 6f torque ripple $T_{61}$ of the first channel C1 and the 6f torque ripple $T_{62}$ of the second channel C2. The 6f torque ripple $T_{61}$, $T_{62}$ in each case lies within the range ±45 kNm. Since the two channels C1, C2 have been phase-shifted by 30°, the 6f torque ripples $T_{61}$, $T_{62}$ cancel each other out, so that the net 6f torque ripple $T_6$ is 0 Nm.

The middle part of the diagram shows the 6f power ripple $P_6$ and the lower part of the diagram shows the 6f Vrms voltage ripple $V_6$ of either one of the two channels C1, C2. With the inventive method, using any of the three approaches described above with the aid of FIGS. 4-7, the 6f power ripple $P_6$ has been reduced to a very favorable level that is significantly less than ±0.01 kW, and the 6f voltage ripple $V_6$ has been reduced to a very favorable level close to zero volts.

Figure 10:
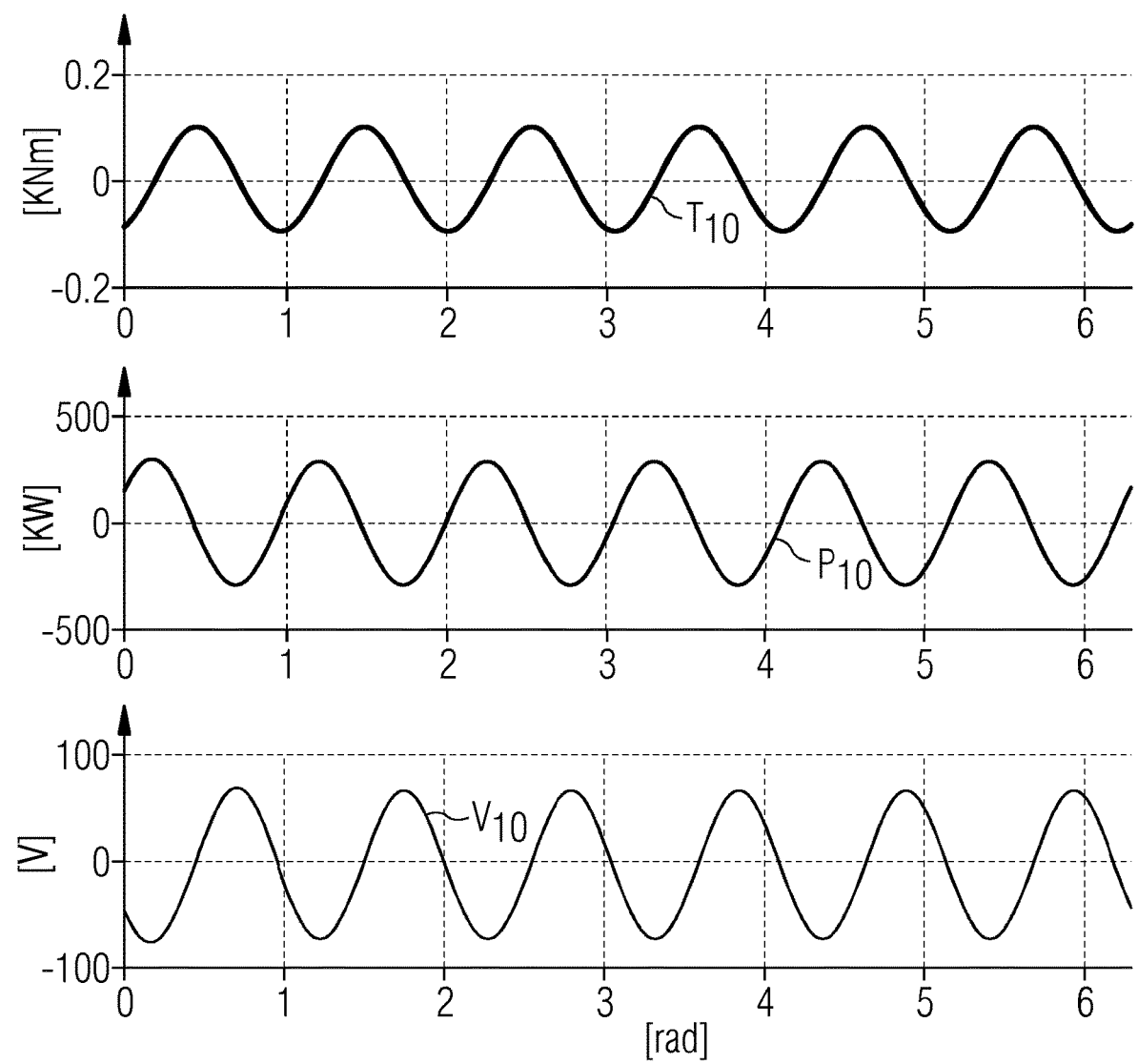
FIG. 10 shows a 6f ripple waveform observed in a conventional art control method.
Figure 11:
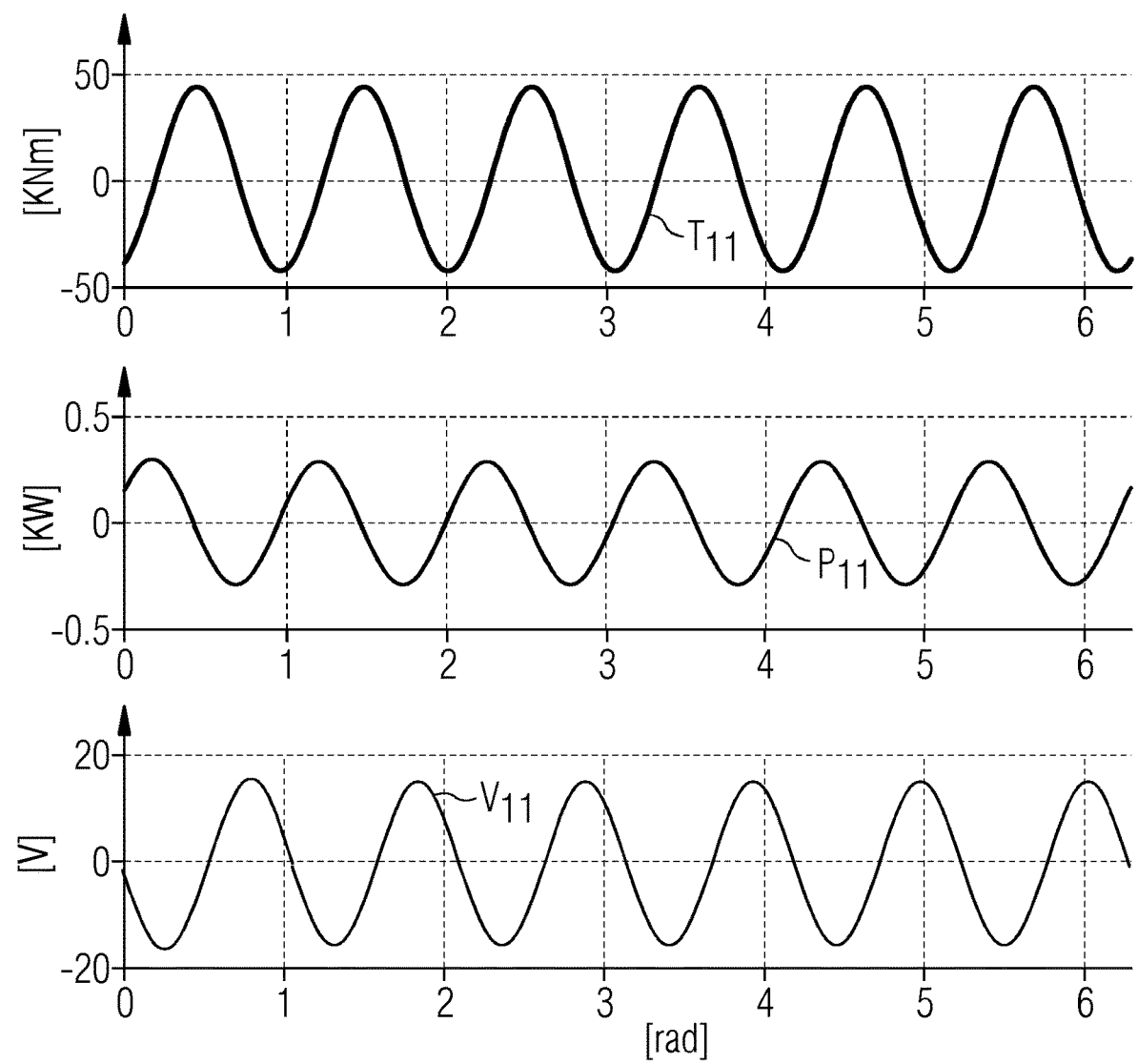
FIG. 11 shows a 6f ripple waveform observed in a conventional art control method.
Figure 12:
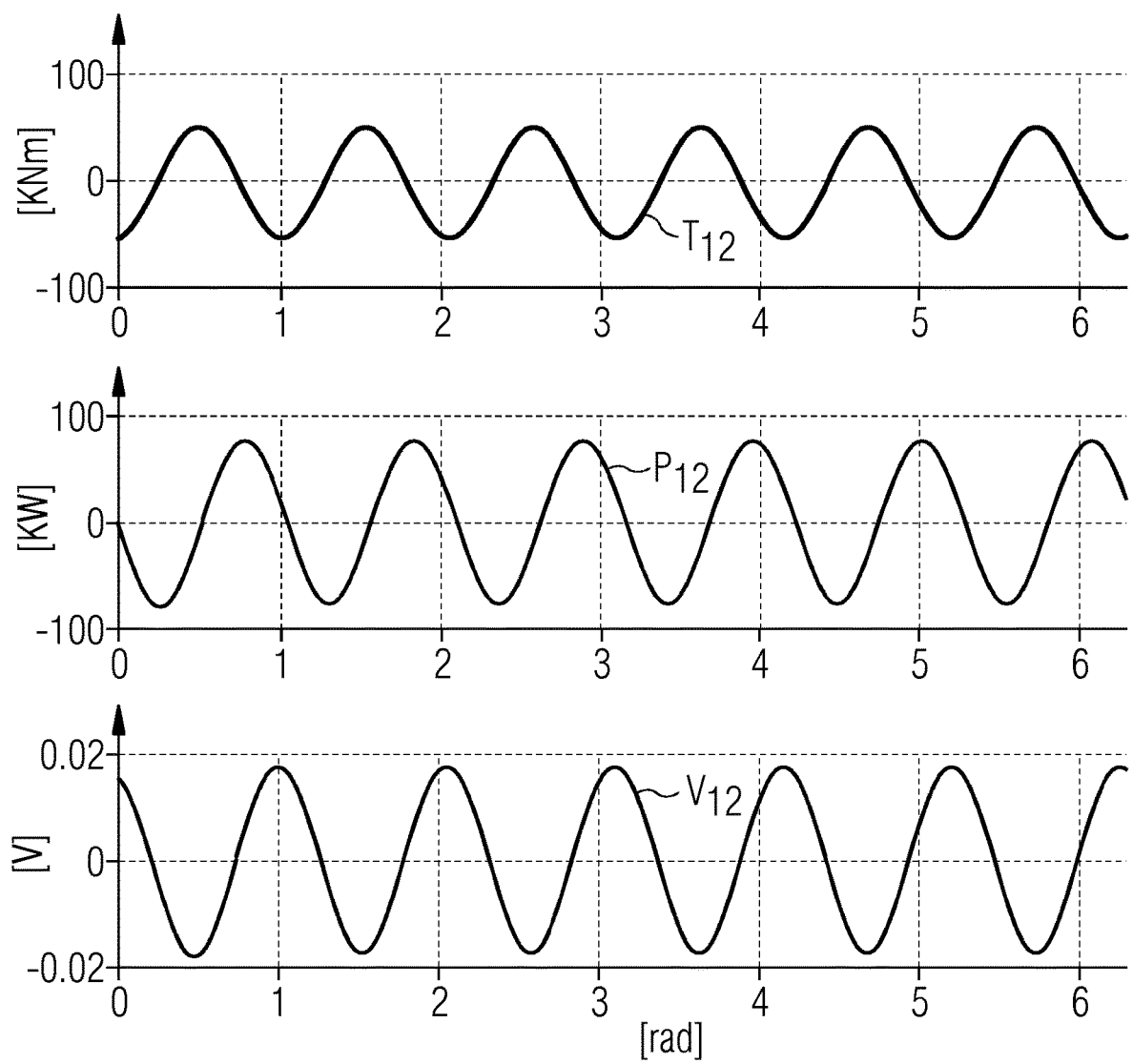
FIG. 12 shows a 6f ripple waveform observed in a conventional art control method.

FIGS. 10-12 show typical waveforms that result when one type of ripple is minimized by $I_q$ harmonic current injection control, i.e. by harmonic current injection in the q-axis, as practiced in the conventional art. The machine being controlled is a dual three-phase generator of a wind turbine. For either one of the two channels C1, C2, the diagrams show the 6f ripple on each of torque, power and rms voltage against rotor electrical angle in radians. When only one type of 6f ripple is minimized, the other two 6f ripple types exhibit significantly higher levels:

In FIG. 10, only the torque ripple is minimized by $I_q$ harmonic current injection. The 6f torque ripple $T_{10}$ now lies within a favorably low range of −0.2-0.2 kNm. However, the 6f power ripple $P_{10}$ is relatively high, reaching ±300 kW. Similarly, 6f voltage ripple $V_{10}$ is also relatively high, reaching ±80 V.

In FIG. 11, only power ripple is minimized by Iq harmonic current injection, and the 6f power ripple $P_{11}$ lies within a favorably low range of ±3 kW. However, 6f voltage ripple $V_{11}$ is also relatively high, reaching ±18 V. The 6f torque ripple $T_{11}$ is relatively high, reaching ±45 kNm.

In FIG. 12, only voltage ripple is minimized by Id harmonic current injection, and the 6f voltage ripple $V_{12}$ now does not exceed ±0.02 V. However, the 6f power ripple $P_{12}$ is also relatively high, reaching ±80 kW. The 6f torque ripple $T_{12}$ is relatively high, reaching ±50 kNm.

These diagrams illustrate that the known approaches to ripple reduction or elimination are only beneficial from the point of view of the reduced ripple, but the problems associated with the other two types of ripple may cancel out those benefits.

Figure 13:
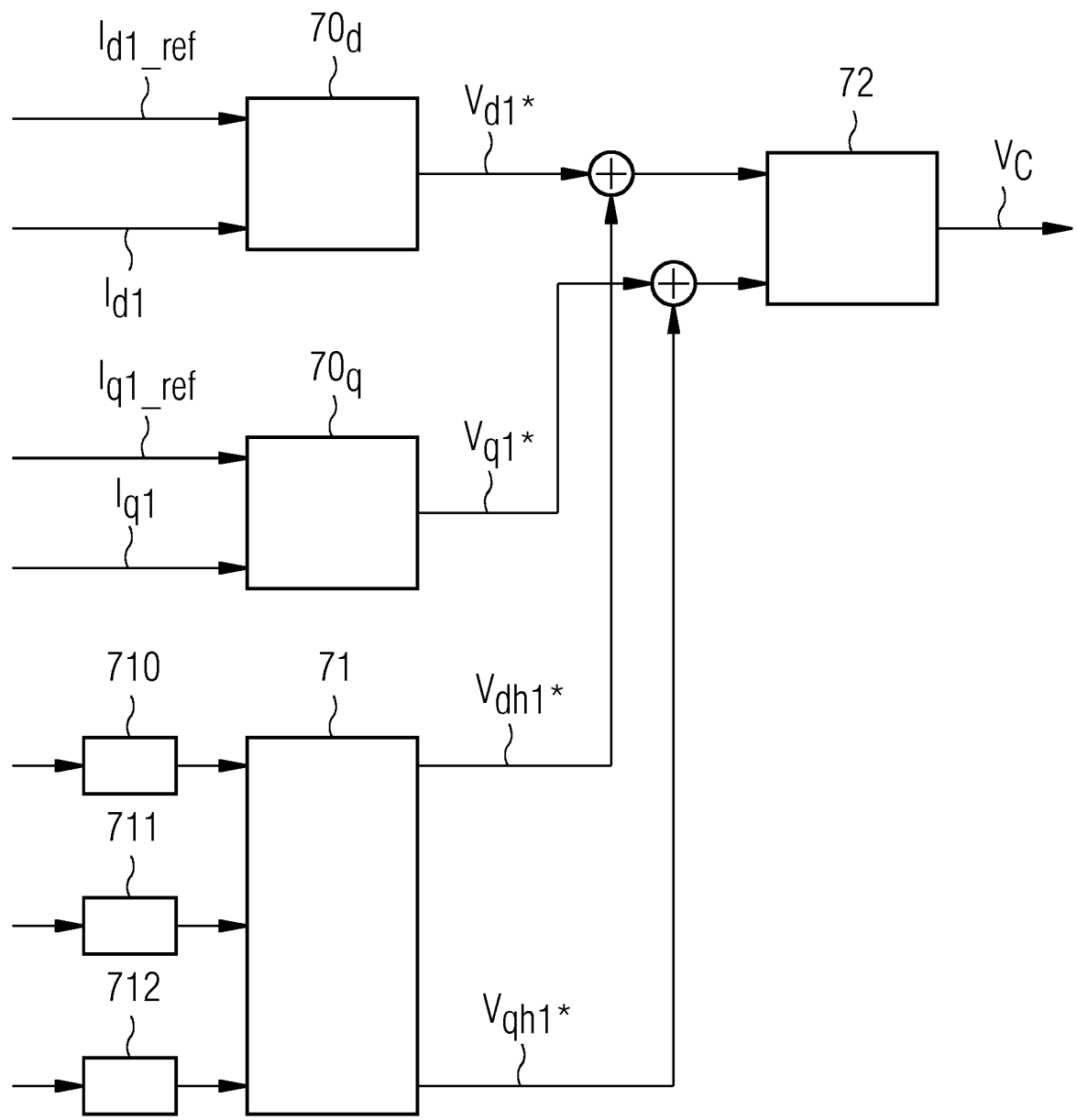
FIG. 13 shows a block diagram of a conventional art controller.

FIG. 13 shows a simple block diagram of a conventional art controller for a first channel of a dual three-phase machine. An Id current controller 70d receives an Id reference Id1_ref and a measured Id value Id1, and computes a d-axis voltage reference Vd1*. An Iq current controller 70q receives an Iq reference Iq1_ref and a measured Iq value Iq1, and computes a q-axis voltage reference Vq1*.

A harmonic current controller 71 provides harmonic voltage references Vqh1*, Vdh1* for a specific harmonic, for example the dominant harmonic. Inputs to the harmonic current controller 71 are received from three modules: a voltage ripple control module 710 that receives the generator Vrms value; a power ripple control module 711 that receives the generator power value; and a torque ripple control module 712 that receives the generator torque value. Each harmonic reference Vqh1*, Vdh1* is summed with the corresponding voltage reference Vq1*, Vd1* and the summed signals are passed to a PWM unit 72 that uses them to control the terminal voltages $V_{C1}$ of the first channel.

Although embodiments of the present invention has been disclosed in the form of preferred embodiments and variations thereon, it will be understood that numerous additional modifications and variations could be made thereto without departing from the scope of embodiments of the invention.

Embodiments of the invention may be applied to electrical machines with different numbers of channels and different numbers of phases. For example, an electrical machine may have three channels each with three phases, and a 20° phase-shift between the channels. If the electrical machine has four channels each with three phases, a 15° phase-shift between the channels is used. For a three-phase machine, it is the 6f harmonic that is dominant and needs to be dealt with using the inventive method. Similarly, an electrical machine may have two/three/four channels each with five phases, and a 18°/12°/9° phase-shift between the channels. In this case, it is the 10f (tenth) harmonic that is dominant and needs to be dealt with using the inventive method. For an electrical machine with two/three/four channels each with seven phases, and a 12.86°/8.57°/6.42° phase-shift between the channels, it is the 14f (fourteenth) harmonic that is dominant and needs to be dealt with using the inventive method.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of controlling a multi-channel multi-phase electrical machine comprising a plurality of channels each with a set of phase windings connected to a converter the method comprising:
    operating the converters to electrically phase-shift the channels; and, for each channel:
        computing harmonic injection currents for a dominant harmonic on a basis of electrical quantities in a rotating reference frame, wherein the injection currents are computed on a basis of a target ripple value for the dominant harmonic, the target ripple value comprising a target power ripple component and a target voltage ripple component;
        determining harmonic voltage references for the dominant harmonic on a basis of the harmonic injection currents; and
        regulating the AC output voltages of that channel of the multi-channel multi-phase electrical machine according to fundamental voltage references and the harmonic voltage references.

2. The method according to claim 1, wherein the harmonic injection currents are computed using a model that relates generator electrical values to generator speed.

3. The method according to claim 1, wherein the injection currents are computed using a feedforward control method.

4. The method according to claim 3, wherein the injection currents are computed from a target ripple specified for the machine output voltage and power.

5. The method according to claim 1, wherein the harmonic injection currents are computed using a decoupled feedback control method.

6. The method according to claim 1, wherein the harmonic injection currents are computed using a multivariable feedback control method.

7. The method according to claim 1, wherein the steps of the method are used to control a dual three-phase electrical machine with a 30° phase-shift between the two channels of the machine.

8. The method according to claim 7, wherein the dominant harmonic is the sixth harmonic.

9. A control arrangement of a multi-channel multi-phase electrical machine, comprising:
    a voltage reference generator configured to generate fundamental voltage references for the machine frequency;
    a harmonic voltage reference generator configured to generate harmonic voltage references for a dominant harmonic of the machine frequency; and
    an output voltage controller configured to control a machine output voltage on a basis of the fundamental voltage references and the harmonic voltage references; and wherein the harmonic voltage reference generator comprises,
    computation modules configured to compute a generator power value and a generator voltage value on the basis of electrical quantities in a rotating reference frame; and
    an injection current computation module configured to compute injection currents for the dominant harmonic on the basis a target ripple value for the dominant harmonic; and
    a harmonic current controller configured to compute the harmonic voltage references from the harmonic injection currents.

10. The control arrangement according to claim 9, wherein the injection current computation module comprises a ripple minimization module.

11. The control arrangement according to claim 9, wherein the injection current computation module comprises a harmonic power regulator and a harmonic voltage regulator.

12. The control arrangement according to claim 9, wherein the injection current computation module comprises a multivariable regulator.

13. A wind turbine comprising
    a multi-channel multi-phase generator; and
    a wind turbine controller comprising the control arrangement according to claim 9.

14. A computer program product comprising a computer readable hardware storage device having computer readable program code stored therein, said program code executable by a processor of a computer system to implement the method of claim 1, wherein the computer readable program code is directly loadable into a memory of a control arrangement of a multi-channel multi-phase electrical machine and which comprises program elements for computing harmonic voltage references.

* * * * *